June 6, 1961 R. K. HOSKIN 2,987,264

INTERLOCK FOR TAPE RECORDING AND REPRODUCING MACHINES

Filed May 9, 1958

RICHARD K. HOSKIN
INVENTOR.
BY Flam and Flam
ATTORNEYS.

United States Patent Office 2,987,264
Patented June 6, 1961

2,987,264
INTERLOCK FOR TAPE RECORDING AND REPRODUCING MACHINES

Richard K. Hoskin, Gardena, Calif., assignor to Newcomb Electronics Corp., Los Angeles, Calif., a corporation of California
Filed May 9, 1958, Ser. No. 734,279
8 Claims. (Cl. 242—55.12)

This invention relates to a tape recorder, and particularly to the speed control of takeup and supply reels for the tape.

There are in general four controls for the operation of the tape reels of a tape recorder: (1) neutral, in which brakes are applied to the spindles or takeup or supply reels for stopping them, the tape being out of operative relationship with respect to the recording or playback heads; (2) a recording or playback, in which the tape is moved slowly from a supply reel to a takeup reel and past a central station at which playback and recording heads are located; (3) a fast rewind, preparatory, for example, to playback; and (4) a fast feed, for example, for bringing a specific portion of the tape quickly to cooperative relationship with respect to one or the other of the heads.

When the controls are shifted from a fast feed or rewind position quickly into a recording or playback position, the inertia of one of the reels causes the tape to unwind from one reel without corresponding winding on the other reel. This is especially true if the transition from fast to slow does not require passage through neutral, at which the brakes are applied. If this unwinding occurs, operations must be immediately stopped and the tape reapplied to the reel by certain careful manipulations, otherwise there is a danger of injuring the tape. Thus, it may become twisted in the feeding mechanism; the tape may be creased and folded, precluding proper recording or playback at the area, or weakening the tape; or upon a subsequent fast rewind, there may be an impact causing fracture of the tape.

The primary object of this invention is to provide apparatus that permits initiation of slow movement of the reels only after the speed of the supply and takeup reels has reduced to a predetermined minimum so that the difficulties above noted are completely overcome.

Although the principles of this invention are applicable generally, it is particularly applicable to an operating device described and claimed in my copending application Serial No. 677,503, filed August 12, 1957, and entitled "Apparatus for Recording and for Playback or Sound Utilizing a Tape." In said copending application, there is provided a single control member or operating rod which is positioned in branches of a T-slot to determine fast wind, fast rewind and slow playback or recording movement. When the control member is at the intersection of the branches, the neutral braking operation is achieved.

In carrying out this invention, I provide means responsive to motion of one of the reel spindles for interposing an abutment or lock in the path of movement of the operating rod in that branch slot corresponding to slow movement. Accordingly, the brakes are given ample opportunity to complete their intended work. Actually, a delay of only about a second may be involved.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense, since the scope of this invention is best defined by the appended claims.

Referring to the drawings.

Figure 1:
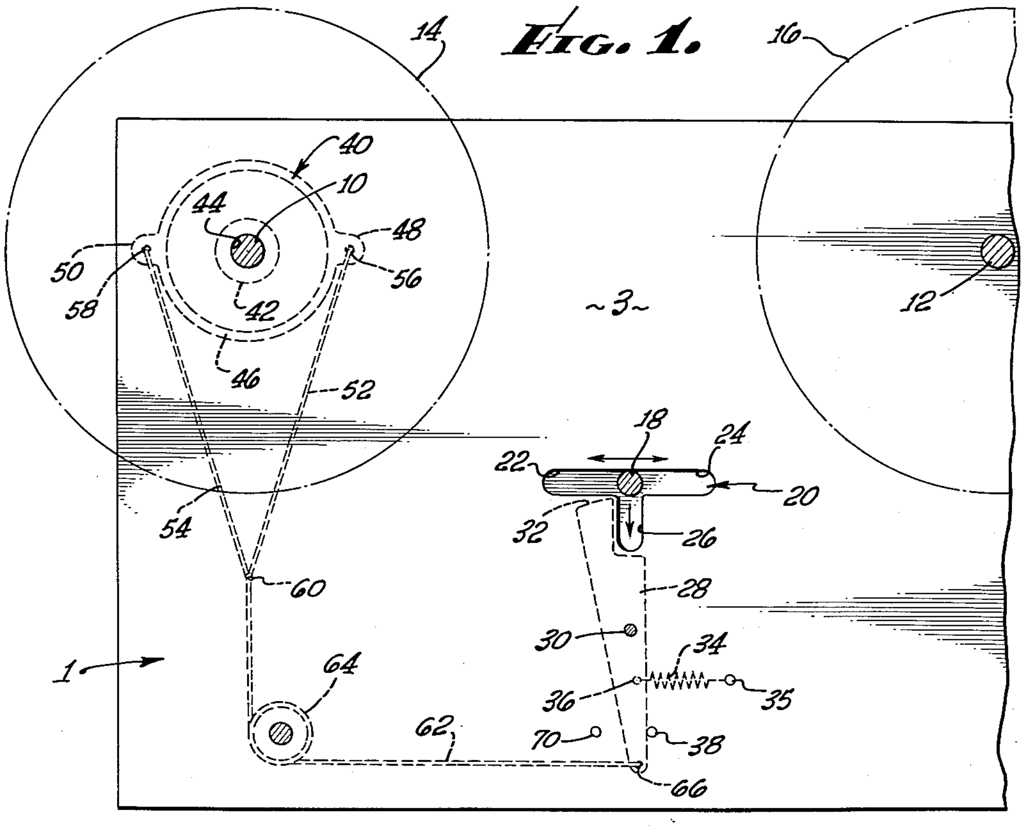
FIGURE 1 is a diagrammatic view of a tape recorder mechanism incorporating the present invention.

In FIG. 1, there is illustrated a casing 1 including a top plate or panel 3 upon which two spindles 10 and 12 are rotatably supported. The spindles 10 and 12 mount supply and takeup reels 14 and 16 above the plate 3.

An operating rod 18, movable in a T-slot 20 of the casing plate 3, determines the modes of movement of the spindles 10 and 12 and the reels 14 and 16 carried thereon. The rod has a handle end (not shown) accessible above the plate 3. The rod may be angularly moved in any of the slots about an axis tranverse to the rod, as explained in said prior application. Details of such structures associated with the rod 18 and the manner in which it operates are also fully described in that copending application.

The T-slot 20 has aligned branches 22 and 24 extending in a direction parallel to a line joining the spindles 10 and 12. Thus, the branch 22 is directed toward the supply reel 14, and the branch 24 is directed toward the takeup reel 16. The third branch 26 extends at right angles to the aligned branches 22 and 24.

Figure 2:
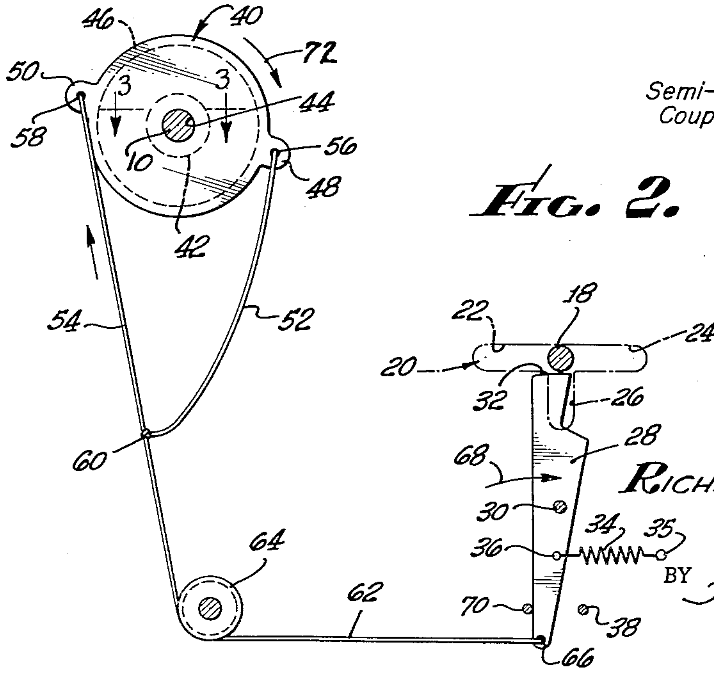
FIG. 2 is a view similar to FIG. 1, but illustrating the apparatus in an alternate position, the panel for supporting the tape apparatus being omitted.
Figure 3:
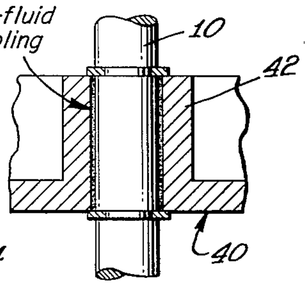
FIG. 3 is an enlarged fragmentary sectional view taken along a plane corresponding to line 3—3 of FIG. 2.

Movement of the operating rod 18 to the left and into the branch slot 22 which extends toward the supply reel 14 causes the tape to be rewound quickly upon the supply reel 14. Movement of the control member or operating rod 18 into the branch slot 24 toward the takeup reel 16 causes the tape to be quickly wound upon the takeup reel 16. Movement of the operating rod 18 into the branch slot 26 causes slow movement of the tape from the supply reel 14 to the takeup reel 16. In FIGS. 1 and 2, the rod 18 is at the juncture of the slot branches. At this position, no driving force is imparted to the supply or takeup reels but, instead, brakes are applied.

An arm 28 located just beneath the plate 3 and pivoted on a pin 30, has an end surface 32 that may be positioned adjacent the mouth of the recording or playback slot 26 to form a restraint against entrance of the operating rod 18. For this purpose, the arm 28 is movable angularly about the pin 30. The arm is biased away from this position, however, by a tension spring 34. The spring 34 is secured respectively to apertures 35 and 36 in the casing plate 3 and the arm 28. The spring 34 thus urges the arm 28 in a counterclockwise direction and against an abutment 38. In this position, the surface 32 clears the mouth of the recording or playback slot 26.

If the reels are moving faster than recording or playback speed, the arm 28 is moved away from the abutment 38 so that the end surface 32 precludes movement of the operating rod away from neutral and into the slot 26. Accordingly, the brakes are kept operative until the reels slow down sufficiently to ensure proper operation.

In order to so move the arm 28 in a direction to interpose the surface 32, a cup member 40 is provided. This cup is carried upon one of the spindles 10 also beneath the plate 3. The cup 40 has a central hub portion 42 and is appropriately apertured, as at 44, for reception of the spindle 10. Relative angular movement is permitted between shaft or spindle 10 and cup 40. When the spindle rotates, friction forces tend correspondingly to move the cup. These forces are used to move the arm 28 so that the surface 32 is operative. The friction between hub 42 and shaft 10 permits slipping between the cup 40 and the shaft.

Flexible cables 52, 54 and 62 couple the cup to the arm 28. The cup 40 has a peripheral flange 46 upon which are formed diametrically disposed ears 48 and 50. Two of the flexible cables 52 and 54, which are of equal length, are joined at one end respectively to the ears 48 and 50. For this purpose, the ears 48 and 50 are apertured, as at 56 and 58. The other ends of the cables 52 and 54 are joined as at 60, and the third cable 62 extends from the juncture 60 about an idler pulley or roller 64 to the arm 28. For this purpose, the cable 62 is secured at an aperture 66 in that end of the arm 28 remote from the surface 32.

The spring 34 acting on the cables 52 and 54 through the arm 28 and the cable 62 pulls the juncture 60 toward the idler pulley 64. The juncture is nearest the idler pulley 64 at the symmetrical orientation of the ears 48 and 50 illustrated in FIG. 1. The cables would thus determine a limited counterclockwise position of the arm 28, but the abutment 38 makes possible the relief of constant strain upon the cables.

Movement of the spindle 10 in either direction drags the cup 40 correspondingly. Thus, if the spindle 10 is rotating in the direction of the arrow 72 in FIG. 2, friction between the spindle and the hub 42 will tend to turn the cup 40 correspondingly in the direction of the arrow 72. This movement results in translation of the cable 62 and clockwise movement of the arm 28. In this instance, slack will be created in the cable 52 while the companion cable 54 moves upwardly, drawing the cable juncture 60 upwardly therewith. The arm 28 accordingly moves in the direction of the arrow 68 and the surface 32 is interposed between the operating rod 18 and the bottom of the slot branch 26. An abutment 70 limits clockwise movement of the arm 28.

Should the spindle 10 be rotating in the opposite direction, the identical operation will result. In this case, the cable 54 will move downwardly, causing slack to exist in this cable while the opposite cable 52 moves upwardly correspondingly moving the cable juncture 60, the cable 62 and the arm 28.

In operation, whenever the spindles 10 and 12 are moving at a substantial rate, the surface 32 is interposed to prevent movement of the operating rod to the bottom of the slot 26. The spindle 10 must virtually stop before the operating rod 18 can enter the recording or reproducing slot 26. Hence, there is no danger whatsoever for the inertia effects of the reels to cause undesired unwinding of the tape.

The surface 32 approximates an arc centered at the mounting pin 30. However, the surface preferably deviates from arcuate relationship so that the force exerted on the arm 28 through the operating rod 18 tends to urge the arm in a clockwise direction and against the stop 70, thereby maintaining the locking relationship.

Since the forces exerted by friction of contact are subject to substantial variations, a semi-fluid coupling between the cup 40 and the spindle 10 is preferred. This is achieved in practice by providing a farily loose fit between the spindle 10 and the hub recess 44 and by providing a suitable fluid as, for example, one with a silicon base, to the space between the spindle 10 and the hub 42.

The inventor claims:

1. In tape recording apparatus including a pair of rotary means for driving takeup and supply reels, movable control means for causing quick movement of the reels in opposite directions, and for causing movement of the reels slowly for recording or playback, the combination therewith of means responsive to predetermined speed of the reels for preventing movement of the control means to recording or playback position.

2. In tape recording apparatus including a pair of rotary means for driving takeup and supply reels, and a control member movable in a plurality of directions from a neutral position in which the reels are caused to be stopped, movement of the control member in one direction causing the reels to move slowly for recording or playback, the combination therewith of movable means deflected by one of said rotary means, and in accordance with the angular speed of said rotary means; and movable locking means operated by deflection of said movable means for preventing movement of said control member in said one direction from said neutral position.

3. In tape recording apparatus including a pair of rotary means for driving takeup and supply reels, movable control means for causing quick movement of the reels in opposite directions, and for causing movement of the reels slowly for recording or playback, the combination therewith of driven means mounted on the rotary means for one of the reels and urged angularly upon rotation of said rotary means; a lock member alternately operable for permitting or preventing movement of the control means to recording or playback position; a connection between the driven means and the lock member; and biasing means urging the driven means toward a limited position in which said connection causes the lock member to permit movement of the control means.

4. The combination as set forth in claim 3 in which said connection comprises a flexible cable including two sections having ends joined to said driven means on opposite sides of the driven means, whereby the cable moves in one direction for angular movement of the driven member in either direction.

5. In a speed responsive interlock mechanism: a pair of movable members, one of said members being a rotary driving member capable of high speed and low speed operation, and the other of said members being a driven member; means forming a yielding friction connection between the members; means determining an equilibrium position occupied by the driven member when the driving member is stopped; means imposing increasing restraint against movement of the driven member from said equilibrium position whereby the driven member occupies a position corresponding to the speed of said rotary driving member; and means movable to determine a slow speed of the driving member, the path of movement thereof being intercepted by said driven member when the driven member is away from its equilibrium position.

6. The combination as set forth in claim 5, in which the friction connection between the driving and driven members includes a semi-fluid coupling.

7. The combination as set forth in claim 5, in which said driving and driven members are angularly movable about a common axis, and in which the flexible element has a pair of branch extensions connected to diametrically opposite places on the driven member.

8. In a speed responsive interlock for a machine utilizing a tape reel: a spindle having provisions at one end for connection to a tape reel; a member journalled to the spindle at a place spaced inwardly of the spindle end; the member being subject to movement by the frictional drag of said spindle; a control lever movable from a first position to a second position for determining slow speed of the tape reel; a spring determining an equilibrium position of the member when the spindle is stopped; a spring increasingly opposing movement of the member from its equilibrium position whereby the position of the member corresponds to the speed of the spindle; and a lock positioned by member in the path of movement of said control lever when the member is away from its equilibrium position.

References Cited in the file of this patent

UNITED STATES PATENTS

| | | |
|---|---|---|
| 831,788 | Houser | Sept. 25, 1906 |
| 1,659,474 | Siemann | Feb. 14, 1928 |
| 1,971,466 | Schaum | Aug. 28, 1934 |
| 1,991,874 | Williams | Feb. 19, 1935 |
| 2,178,066 | Clark | Oct. 31, 1939 |
| 2,665,855 | Stone | Jan. 12, 1954 |